United States Patent
Minami et al.

(10) Patent No.: US 6,737,372 B2
(45) Date of Patent: May 18, 2004

(54) POWDERS-AFFIXED NONWOVEN FABRIC, PROCESS FOR MANUFACTURING SAME, AND SHEET MATERIAL CONTAINING SAME

(75) Inventors: Akinori Minami, Ibaraki (JP); Masaaki Kawabe, Ibaraki (JP)

(73) Assignee: Japan Vilene Company, Ltd., Tokyo (JP)

( * ) Notice: Subject to any disclaimer, the term of this patent is extended or adjusted under 35 U.S.C. 154(b) by 146 days.

(21) Appl. No.: 10/003,415

(22) Filed: Dec. 6, 2001

(65) Prior Publication Data

US 2002/0100548 A1 Aug. 1, 2002

(30) Foreign Application Priority Data

Dec. 6, 2000 (JP) .......................... 2000-370965

(51) Int. Cl.[7] ................................. B32B 5/02
(52) U.S. Cl. ............... 442/340; 442/417; 428/903; 156/308.2; 264/518; 264/172.19
(58) Field of Search ................ 442/340, 417; 428/903; 156/308.2; 264/518, 172.19

(56) References Cited

U.S. PATENT DOCUMENTS

| | | | |
|---|---|---|---|
| 3,453,355 A | | 7/1969 | Groeger |
| 3,971,373 A | | 7/1976 | Braun |
| 5,605,746 A | | 2/1997 | Groeger |
| 5,885,696 A | * | 3/1999 | Groeger .................. 428/206 |
| 5,962,112 A | * | 10/1999 | Haynes et al. ............ 428/198 |

FOREIGN PATENT DOCUMENTS

| | | |
|---|---|---|
| EP | 1191139 A2 | 3/2002 |
| JP | 002195664 | 9/1997 |
| WO | WO 00/29657 A1 | 5/2000 |

* cited by examiner

*Primary Examiner*—Elizabeth M. Cole
(74) *Attorney, Agent, or Firm*—Sughrue Mion, PLLC (57) ABSTRACT

Disclosed is a powders-affixed nonwoven fabric prepared from a fiber web comprising powder materials and fine short fibers having a fiber diameter of 4 μm or less and a fiber length of 3 mm or less in a dispersed state in the powders-containing fiber web, the powders-containing fiber web being formed by a method other than a wet-laid method. Further, a process for manufacturing the powders-affixed nonwoven fabric, and a sheet material comprising the powders-affixed nonwoven fabric are also disclosed.

13 Claims, 1 Drawing Sheet

POWDERS-AFFIXED NONWOVEN FABRIC, PROCESS FOR MANUFACTURING SAME, AND SHEET MATERIAL CONTAINING SAME

BACKGROUND OF THE INVENTION

1. Field of the Invention

The present invention relates to a nonwoven fabric carrying powder materials affixed thereon, i.e., a powders-affixed nonwoven fabric, a process for manufacturing the same, and a sheet material comprising the same.

2. Description of the Related Art

A fibrous material carrying powder materials affixed thereon is disclosed in, for example, Japanese Unexamined Patent Publication No. 63-135550 wherein a fibrous material carrying powdery binding agents is disclosed. However, the fibrous material is a starting material for a glassfiber-reinforced plastic molding, and fibers having a single fiber diameter of 5 to 20 $\mu$m and a fiber length of 4 to 25 mm as the glass fibers. Thus, the powder materials having small particle diameters are not firmly bonded, but easily drop when the fibrous material is vibrated or shocked. Further, Japanese Unexamined Patent Publication No. 7-313863 discloses an air-mixing method of reinforcing fibers and resin powders by a gas stream, for preparing a preform of a fiber-reinforced plastics. However, the reinforcing fibers used are apparently thick and long, and thus, the method has disadvantages same as the above method.

Further, methods for bonding powder materials to a nonwoven fabric were known. For example, there was a method for fixing powder materials by sandwiching the powder materials between fiber webs, and needle-punching the fiber webs to physically entrap the powder materials between fibers. Further, there was a method for enhancing the bonding by sandwiching the powder materials between fiber webs containing heat-sensitive adhesive fibers, and adhering the powder materials and the fibers, and the fibers to each other. However, there was a disadvantage in that small powder materials having an average particle diameter of about 50 $\mu$m or less are liable to fall, when the nonwoven fabric is vibrated or shocked, and therefore, the nonwoven fabric can merely bond relatively large powder materials having an average particle diameter of more than 50 $\mu$m.

A method for enhancing holdability of the powder materials having small particle diameters, using a fiber web having a denser structure was known. The method was a wet-laid method wherein such powder materials were deposited together with fibers. However, there was a disadvantage in that slurry used in the wet-laid method contains surface-active agents or sizing agents which cover the surfaces of the powder materials, and thus, inherent functions of the powder materials are lost.

SUMMARY OF THE INVENTION

The inventors of the present invention engaged in intensive research to remedy the above disadvantages of the prior art, and to provide a powders-affixed nonwoven fabric from which fine powder materials hardly drop, and which can express inherent functions thereof, and a process for manufacturing the same. As a result, the inventors found a means for solving the above problems, more particularly, that a method other than a wet-laid method must be used in order to maintain and express the inherent functions of the powder materials, and a falling of the powder materials from the nonwoven fabric can be prevented by dispersing fine short fibers having a particular thickness or less and a particular length or less to surround the powder materials by the fine short fibers, preferably entangle the fine short fibers as a spider's web, and narrow gaps between the fine short fibers.

The present invention is based on the above findings.

Other objects and advantages of the present invention will be apparent from the following description.

In accordance with the present invention, there is provided a powders-affixed nonwoven fabric prepared from a fiber web comprising fine short fibers having a fiber diameter of 4 $\mu$m or less and a fiber length of 3 mm or less in a dispersed state in the powders-containing fiber web, the powders-containing fiber web being formed by a method other than a wet-laid method.

When an average particle size of the powder materials in the powders-affixed nonwoven fabric is 50 $\mu$m or less, functions of the powder materials can be expressed to a maximum degree. Further, when a mass ratio of the fine short fibers with respect to a whole mass of the powders-affixed nonwoven fabric is 1 to 40 mass %, functions of the powder materials can be expressed to a maximum degree, because an amount of the powder materials becomes large. When an adhesion rate of substances adhered to the powders-affixed nonwoven fabric is 0.5 mass % or less, functions of the powder materials are not affected by the substances adhered to the powders-affixed nonwoven fabric.

The inventors of the present invention also found that when aggregates of fine short fibers or a group of the aggregates, and/or mechanically dividable fibers capable of generating fine short fibers or aggregates of the mechanically dividable fibers are ejected together with powder materials from a nozzle into a gas by an action of a compressed gas, the aggregates of the fine short fibers or the groups thereof and/or the mechanically dividable fibers or the aggregates thereof are loosed and dispersed, the powder materials are also dispersed, and individual powder materials are entangled by the fine short fibers as in a spider's web.

In accordance with the present invention, there is also provided a process for manufacturing a sheet material comprising the steps of:

ejecting aggregates of fine short fibers having a fiber diameter of 4 $\mu$m or less and a fiber length of 3 mm or less, or a group of the aggregates, and/or mechanically dividable fibers capable of generating fine short fibers having a fiber diameter of 4 $\mu$m of less and a fiber length of 3 mm or less, or aggregates of the mechanically dividable fibers, together with powder materials, from a nozzle into a gas by an action of a compressed gas, to thereby divide the aggregates of the fine short fibers or the group thereof into the fine short fibers, and/or divide the mechanically dividable fibers or the aggregates thereof into the fine short fibers, and disperse the resulting fine short fibers and the powder materials;

collecting the dispersed fine short fibers and the powder materials to form a powder-containing fiber web; and affixing the powder materials, while forming a nonwoven fabric from the powders-containing fiber web, and at the same time bonding a layer free of the powder materials, to obtain the sheet material containing a powders-affixed nonwoven fabric.

In accordance with the present invention, there is also provided a sheet material comprising at least one layer of a powders-affixed nonwoven fabric prepared from a fiber web comprising powder materials and fine short fibers having a fiber diameter of 4 μm or less and a fiber length of 3 mm or less in a dispersed state in the fiber web, the powders-containing fiber web being formed by a method other than a wet-laid method.

The sheet material can further contain a layer free of the powder material to thereby prevent the powder materials from falling on at least one surface, and such a layer can more effectively prevent the falling of the powder materials.

In accordance with the present invention, there is also provided a process for manufacturing a sheet material comprising the steps of:

Ejecting aggregates of fine short fibers having a fiber diameter of 4 μm or less and a fiber length of 3 mm or less, or a group of the aggregates, and/or mechanically dividable fibers capable of generating fine short fibers having a fiber diameter of 4 μm of less and a fiber length of 3 mm or less, or aggregates of the mechanically dividable fibers, together with powder materials, from a nozzle into a gas by an action of a compressed gas, to thereby divide the aggregates of the fine short fibers or the group thereof into the fine short fibers, and/or divide the mechanically dividable fibers or the aggregates thereof into the fine short fibers, and disperse the resulting fine short fibers and the powder materials;

collecting the dispersed fine short fibers and the powder materials to form a powder-containing fiber web;

and affixing the powder materials, while forming a non-woven fabric from the powders-containing fiber web, and at the same time bonding a layer free of the powder materials, to obtain the sheet material containing a powders-affixed nonwoven fabric.

DESCRIPTION OF THE PREFERRED EMBODIMENTS

The powders-affixed nonwoven fabric of the present invention contains fine short fibers having a fiber diameter of 4 μm or less, so that excellent properties, such as holdability of the powder materials, are exhibited. When the powders-affixed nonwoven fabric of the present invention contains the fine short fibers having a smaller fiber diameter, the nonwoven fabric can hold powder materials having smaller diameters. Therefore, the fiber diameter is preferably 3 μm or less, more preferably 2 μm or less. There is no particular lower limit of the fiber diameter of the fine short fibers, but about 0.01 μm is appropriate.

The term "fiber diameter" as used herein with respect to a fiber having a circular cross-sectional shape means a diameter of the circle. For a fiber having a non-circular cross-sectional shape, a diameter of a circle having an area the same as that of the non-circular cross-sectional shape is regarded as the diameter.

The fine short fibers forming the powders-affixed nonwoven fabric of the present invention have a fiber length of 3 mm or less so that the fine short fibers exhibit an excellent dispersibility. If the fine short fibers have a fiber length of more than 3 mm, a degree of freedom thereof is low, and thus the dispersibility becomes lowered. The fiber length is preferably 2 mm or less. The lower limit of the fiber length of the fine short fiber is not particularly limited, but is appropriately about 0.1 mm. The fine short fibers cut into a fiber length of 3 mm or less in such a way that they have a uniform fiber length are preferable.

The term "fiber length" as used herein means a value measured in accordance with JIS L 1015 (a testing method for man-made staple fibers), the B method (an amended method for staple diagram).

The fine short fibers used in the present invention may be prepared from any material, such as an organic or inorganic material, for example, an organic material, such as polyamide based resin, polyvinyl alcohol based resin, polyvinylidene chloride based resin, polyvinyl chloride based resin, polyester based resin, polyacrylonitrile based resin, polyolefin based resin (such as polyethylene based resin, or polypropylene based resin), polystyrene based resin (such as crystalline polystyrene, or amorphous polystyrene), whole aromatic polyamide based resin, or polyurethane based resin; or an inorganic material, for example, glass, carbon, potassium titanate, silicon carbide, silicon nitride, zinc oxide, aluminum borate, or Wollastonite.

In general, the fine short fibers made of one or more organic materials have rigidity lower than that of the fine short fibers made of inorganic materials, and thus are softer than the latter. The former fine short fibers are easily entangled with each other, and therefore, it is more difficult to uniformly disperse the former fine short fibers, and thus to obtain advantages due to the containing of the fine short fibers. On the contrary, the fine short fibers in the powders-affixed nonwoven fabric of the present invention are uniformly dispersed, and therefore, properties due to the containing of the fine short fibers made of organic materials, such as bulkiness, hand and feel, and elasticity, are improved.

The fibers contained in the powders-affixed nonwoven fabric of the present invention are preferably bonded with each other to maintain the shape of the powders-affixed nonwoven fabric. More preferably, the fine short fibers are fusible, because the shape of the powders-affixed nonwoven fabric can be maintained by the fusion of the fine short fibers, and the fine short fibers and the powder materials are rarely dropped. The fusible fine short fiber may be a fiber containing a thermoplastic resin on at least a part of the surface of the fine short fiber. The material for the surface of the fine short fiber may be, for example, a crystalline thermoplastic resin, such as a polyolefin based resin (such as polyethylene based resin, or polypropylene based resin), polyvinylidene chloride based resin, polyester based resin, polyamide based resin, crystalline polystyrene; or an amorphous thermoplastic resin, such as polyvinyl chloride based resin, amorphous polystyrene based resin, polyacrylonitrile based resin, or polyvinyl alcohol based resin. Of the above resins, the polyethylene based resin having a relatively lower melting point or polyvinyl acetate resin having a relatively lower melting point is preferable. Further, inorganic fibers such as glass fibers, or metallic fibers such as copper fibers may be used.

Preferably, the fusible fine short fiber is composed of two or more components having a melting point different from each other, because a form or shape of the fusible fine short fiber may be maintained due to the presence of at least one non-fusible component. When the fusible fine short fiber is a composite fiber composed of two or more components, the cross-sectional shape may be, for example, a sheath-core type, an eccentric type, an islands-in-sea type, a side-by-side type, a multilayered-bicomponent type (or bicomponent type), or an orange type.

Preferably, each of the fine short fibers has a diameter that does not substantially change in an axial direction of the fiber, namely, has substantially the same diameter, so that the powders-affixed nonwoven fabric has an excellent uniformity. The fine short fibers having substantially the same diameter that does not substantially change in an axial direction of the fiber may be prepared, for example, by removing sea components from islands-in-sea type fibers obtained by a composite spinning method, such as a method for extrusion of and adjustment of a composition of island components into sea components under the condition that a spinning nozzle is controlled. In general, the fine short fibers prepared by removing sea components from islands-in-sea type fibers are liable to form bundled aggregates of the fine short fibers derived from island components, to be in close contact with each other, and easily entangled with each other. Therefore, it would be difficult to uniformly disperse such fine short fibers, and thus to obtain advantages due to the containing of the fine short fibers. On the contrary, even if the bundled aggregates of the fine short fibers are used, the fine short fibers are not in the form of bundled aggregates, can be uniformly dispersed in the powders-affixed nonwoven fabric of the present invention, and therefore, properties due to the containing of the fine short fibers are obtained. Further, bundled aggregates of the fine short fibers prepared by removing sea components from islands-in-sea type fibers are liable to be cohered, and thus, it would be difficult to uniformly disperse such fine short fibers. On the contrary, even in the form of the bundled aggregates the fine short fibers can be uniformly dispersed in the powders-affixed nonwoven fabric of the present invention, and therefore, properties due to the containing of the fine short fibers are obtained.

The fine short fibers used in the present invention may be undrawn, but preferably are drawn, because a good mechanical strength is thus obtained.

In the powders-affixed nonwoven fabric of the present invention, the powder materials are bonded to the fiber web wherein the fine short fibers are dispersed, and the powder materials are held by the fine short fibers. Therefore, the falling of the powder materials can be prevented. Further, the fiber web is formed by a method other than a wet-laid method, and thus, the powder materials are not covered with surface-active agents or sizing agents that are present in the fiber web prepared by the wet-laid method. Therefore, inherent functions of the powder materials can be exhibited. The method other than the wet-laid method is not particularly limited, so long as it does not a method wherein slurry containing surface-active agents and/or sizing agents is used to disperse fine short fibers and powder materials. The method other than the wet-laid method is, for example, a method wherein a gas is used as a dispersing medium to form a fiber web. Preferable method comprises falling and depositing the fine short fibers dispersed in a gas, and bonding them by an appropriate bonding method, such as a heat fusing method.

The powder materials which may be used in the present invention are not particularly limited, but for example, organic powder materials, inorganic powder materials, metallic powder materials, or composite powder materials of organic and inorganic materials, such as inorganic powder materials covered with organic resins. The powder materials can be selected in accordance with an application of the powders-affixed nonwoven fabric of the present invention. For example, activated carbon may be used when the powders-affixed nonwoven fabric is used for decomposing ozone; ion exchanging resin powders may be used when the powders-affixed nonwoven fabric is used for an ion exchange; catalytic powder materials, such as manganese dioxide, platinum, or titanium oxide, may be used when the powders-affixed nonwoven fabric is used for catalytic applications; powder materials of deodorizing agents may be used when the powders-affixed nonwoven fabric is used for deodorizing applications; powder materials of heat sensitive resins may be used when the powders-affixed nonwoven fabric is used for fiber reinforced plastics (FRP) or a sheet molding compound (SMC); powder materials of thermosetting resins may be used when the powders-affixed nonwoven fabric is used for fiber reinforced plastics, such as overlay materials, for a ship or a bathtub; or inorganic powder materials may be used when the powders-affixed nonwoven fabric is used for a refractory board.

It is preferable that the powder materials contain, for example, heat-fusible resin powder materials, such as polypropylene or polyethylene, thermosetting resin powder materials, such as thermosetting polyethylene terephthalate or phenol resin, inorganic powder materials, such as glass, metallic powder materials, such as zinc, aluminum or tin, because the powder materials can be firmly bonded to the powders-affixed nonwoven fabric due to adhesive properties thereof.

In a preferred embodiment, the powder materials contain heat-fusible resin on a part of the surface thereof, because the powder materials can be firmly bonded to the powders-affixed nonwoven fabric by the heat-fusible resin.

The powders-affixed nonwoven fabric of the present invention can hold the powder materials having an average particle diameter of 50 $\mu$m or less that are liable to fall from the conventional nonwoven fabric, because the fine short fibers are used in the present invention. The powder materials are held mainly by the fine short fibers, and thus, the powder materials which can be held vary with fiber diameters of the fine short fibers used. In the powders-affixed nonwoven fabric of the present invention, the fine short fibers having appropriate fiber diameter can be selected in accordance with the average particle diameters of the powder materials to be held. A relationship of the fiber diameters of the fine short fibers and appropriate average particle diameters of the powder materials is shown in the following Table 1.

TABLE 1

| | Fiber diameters of the fine short fibers | Average particle diameter of powder materials which can be held |
|---|---|---|
| 1 | 2 to 4 $\mu$m | 10 to 50 $\mu$m |
| 2 | 1 to 2 $\mu$m | 5 to 10 $\mu$m |
| 3 | 0.5 to 1 $\mu$m | 1 to 5 $\mu$m |
| 4 | 0.5 $\mu$m or less | 1 $\mu$m or less |

The fiber web of the present invention can hold the powder materials having an average particle diameter of more than 50 $\mu$m.

The term "average particle diameter" as used herein means a value determined by a Coulter counting method.

The powder materials are in a bonded state in the fiber web as above, and thus, do not fall from the powders-affixed nonwoven fabric. The expression "bonded state" as used herein means a state where the powder materials are fixed, for example, a state where the powder materials are fixed by surrounding them mainly by the fine short fibers, a state where the powder materials are fixed by a fusion of the fine short fibers and/or thick fibers as mentioned below, or a state where the powder materials are fixed by a combination of the above means.

In the powders-affixed nonwoven fabric of the present invention, the mass ratio of the fine short fibers with respect to the whole mass of the powders-affixed nonwoven fabric vary with the average particle diameters or specific gravities of the powder materials, or the fiber diameters of the fine short fibers. However, when the mass ratio is 40 mass % or less, the small powder materials having an average diameter of 50 µm or less can be held without falling. The small powder materials do not fall from the powders-affixed nonwoven fabric, when the mass ratio is 20 mass % or less. Even if the mass ratio is 10 mass % or less, the powders-affixed nonwoven fabric has no practical problems, for example, has a sufficient strength for a practical handling. When the mass ratio of the fine short fibers is 1 mass % or more, the powder materials rarely fall, and a sufficient strength for a practical handling may be obtained.

As above, the fine short fibers are dispersed in the powders-affixed nonwoven fabric of the present invention, and thus, the properties due to the containing of the fine short fibers can be obtained. An amount of the fine short fibers in fibers forming powders-affixed nonwoven fabric is preferably 20 mass % or more, more preferably 50 mass % or more, most preferably 100 mass %, so that the properties due to the containing of the fine short fibers can be obtained.

The powders-affixed nonwoven fabric of the present invention may contain, in addition to the fine short fibers defined as above, (1) fibers having a fiber diameter of more than 4 µm and a fiber length of 3 mm or less, hereinafter referred to as thick fibers, (2) fibers having a fiber diameter of 4 µm or less and a fiber length of more than 3 mm, hereinafter referred to as long fibers, or (3) fibers having a fiber diameter of more than 4 µm and a fiber length of more than 3 mm, hereinafter referred to as thick-long fibers. Of these fibers, the long fibers and the thick-long fibers having a fiber length of more than 3 mm exhibit a poor dispersibility, and may affect the dispersibility of the fine short fibers. Thus, it is preferable to use the thick fibers having a fiber length of 3 mm or less.

The upper limit of the fiber diameter of the thick fiber used is not particularly limited, but is appropriately about 50 µm. because the uniformity of the powders-affixed nonwoven fabric may be affected when the fiber diameter of the thick fibers is too thick in comparison with the fiber diameter of the fine short fibers.

The thick fibers have a fiber length of preferably 2 mm or less, so as to have an excellent dispersibility. The lower limit of the fiber length of the thick fiber is not particularly limited, but is appropriately about 0.1 mm. The thick fibers, which are cut into a fiber length of 3 mm or less in such a way that they have a uniform fiber length, are preferable.

As the fine short fibers, the thick fibers may be prepared from any material, such as an organic or inorganic material, for example, an organic material, such as polyamide based resin, polyvinyl alcohol based resin, polyvinylidene chloride based resin, polyvinyl chloride based resin, polyester based resin, polyacrylonitrile based resin, polyolefin based resin (such as polyethylene based resin, or polypropylene based resin), polystyrene based resin (such as crystalline polystyrene, or amorphous polystyrene), whole aromatic polyamide based resin, or polyurethane based resin; or an inorganic material, for example, glass, carbon, potassium titanate, silicon carbide, silicon nitride, zinc oxide, aluminum borate, or Wollastonite.

When the thick fibers are fusible, the shape of powders-affixed nonwoven fabric of the present invention can be maintained by the fusion of the thick fibers. The fusible thick fiber may be a fiber containing a thermoplastic resin on at least a part of the surface of the thick fiber. The material for the surface of the thick fiber may be, for example, a crystalline thermoplastic resin, such as polyolefin based resin (such as polyethylene based resin, or polypropylene based resin), polyvinylidene chloride based resin, polyester based resin, polyamide based resin, crystalline polystyrene; or an amorphous thermoplastic resin, such as polyvinyl chloride based resin, amorphous polystyrene based resin, polyacrylonitrile based resin, or polyvinyl alcohol based resin. Of the above resins, the polyethylene based resin having a relatively lower melting point or polyvinyl acetate resin having a relatively lower melting point is preferable. Further, inorganic fibers such as glass fibers, or metallic fibers such as copper fibers may be used.

Preferably, the fusible thick fiber is composed of two or more components having a melting point different from each other, because a form or shape of the fusible thick fiber may be maintained due to the presence of at least one non-fusible component, when one of the components is fused. When the fusible thick fiber is a composite fiber composed of two or more components, the cross-sectional shape may be, for example, a sheath-core type, an eccentric type, an islands-in-sea type, a side-by-side type, a multilayered-bicomponent type (or bicomponent type), or an orange type.

The thick fibers may be undrawn, but preferably are drawn because a good mechanical strength is thus obtained.

In the powders-affixed nonwoven fabric of the present invention, an adhesion rate of substances (such as surface-active agents or sizing agents) adhered to the powders-affixed nonwoven fabric is preferably 0.5 mass % or less, so that the functions of the powder materials are affected by the adhered substances. The functions of the powder materials cannot be affected as the adhesion rate is lowered. Therefore, the adhesion rate is preferably 0.3 mass % or less, more preferably 0.1 mass % or less, still more preferably 0.08 mass % or less, still more preferably 0.06 mass % or less, still further more preferably 0.04 mass % or less, most preferably 0.02 mass % or less. Such a low level of the adhesion rate of the adhered substances cannot be achieved by a conventional wet-laid method. It is difficult to lower the adhesive rate of the adhered substances by treating a wet-laid fibers web which contains the adhered surface-active agents and sizing and carries powder materials, for example, by a water jet.

When the adhesion rate of the adhered substances is very low in the powders-affixed nonwoven fabric of the present invention, the possibility of a dropping of the adhered substances from the powders-affixed nonwoven fabric becomes very low upon the use of the powders-affixed nonwoven fabric. This can provide various effects. For example, although a conventional nonwoven fabric may be used as a filter for physically adsorbing and removing dust materials contained in a fluid to be treated, the filter per se, i.e., the conventional nonwoven fabric per se, generally generates pollutants, and its role as a filter is deteriorated. On the contrary, in the powders-affixed nonwoven fabric of the present invention or the sheet material containing at least one powders-affixed nonwoven fabric layer of the present invention, the adhered substances are present in a small amount. Therefore, the possibility of the dropping of the adhered substances is very low, and the powders-affixed nonwoven fabric of the present invention or the sheet material of the present invention may be preferably used as a filter.

The adhesion rate of the adhered substances means a percentage of a mass of the adhered substances to a mass of the powders-affixed nonwoven fabric, namely, a value calculated from the equation (1):

$$A = (ms/mf) \times 100 \tag{1}$$

wherein A denotes the adhesion rate (%), ms denotes a mass (g) of the adhered substances, and mf denotes a mass (g) of the powders-affixed nonwoven fabric.

The term "adhered substances" as used herein includes an extract (hereinafter referred to as a hot-water extract) obtained by dipping the powders-affixed nonwoven fabric in hot water at, for example, 80 to 100°C. for 15 minutes; and an extract (hereinafter referred to as a hot-methanol extract) obtained by dipping the powders-affixed nonwoven fabric in hot methanol for 15 minutes. The hot-water extract is, for example, a sizing agent, such as acrylamide, sodium polyacrylate, sodium polyalginate, polyethylene oxide, methylcellulose, carboxymethylcellulose, hydroxymethylcellulose, or polyvinyl alcohol. The hot-methanol extract is, for example, a surface-active agent, i.e., a compound having one or more hydrophilic groups and one or more lipophilic groups, such as a nonionic surface-active agent.

The fibers, such as the fine short fibers and thick fibers, forming the powders-affixed nonwoven fabric of the present invention and/or the powder materials are bonded preferably by a fusion thereof. This is because the dropping of the powder materials can be more effectively prevented.

The powders-affixed nonwoven fabric of the present invention may be a unilayered fabric or contain two or more fine-short-fibers-dispersed layers containing the powder materials affixed thereto. When the fabric contains two or more fine-short-fibers-dispersed layers containing the powder materials affixed thereto, various characteristics may be imparted. For example, a powders-affixed nonwoven fabric formed from a powders-affixed nonwoven fabric layer wherein the affixed powder material is an ion exchange resin, and a powders-affixed nonwoven fabric layer wherein the affixed powder material is a deodorizing agent has functions of an ion exchanging property and a deodorizing property.

Even if the powders-affixed nonwoven fabric of the present invention is composed only of the powders-affixed nonwoven fabric layer wherein the powder materials are bonded to the fibers, the falling of the powder materials are sufficiently prevented in a practical use. If the falling of a very small amount of the powder materials must be prevented, however, it is preferable that the powders-affixed nonwoven fabric of the present invention further contains a layer free of the powder materials, such as a layer preventing the powder materials from falling on surfaces where the falling must be prevented, on at least one surface.

The powders-falling-preventing layer is not particularly limited, so long as it has the function to prevent the falling of the powder materials, but is preferably composed of a nonwoven fabric prepared from a fiber web formed by fine short fibers having a fiber diameter same as or smaller than that of the fine short fibers forming the powders-affixed nonwoven fabric layer, i.e., 4 μm or less, although the fiber diameters vary with the average particle diameters of the powder materials affixed thereto. The nonwoven fabric for the powders-falling-preventing layer maintains its shape as the nonwoven fabric, for example, by a fusion of the fine short fibers. The nonwoven fabric for the powders-falling-preventing layer may be prepared, for example, by a method for preparing the powders-affixed nonwoven fabric layer as mentioned below, except that the powder materials are not supplied; or a method wherein a fiber web is prepared by a conventional wet-laid method, and then, the fiber web is bonded by the fusibility of the fine short fibers, or entangled by a fluid stream, such as a water jet, or treated by a combination thereof.

Further, depending of the average powder diameters of the powder materials used, the powders-falling-preventing layer which may be used is a nonwoven fabric prepared by a melt-blown method, or a nonwoven fabric prepared by forming a fiber web containing mechanically dividable fibers by a dry-laid or wet-laid method, and entangling the fiber web by a fluid stream, such as a water jet.

A mass per unit area of the powders-falling-preventing layer may vary with the kind of the fibers forming the powders-falling-preventing layer or the structure thereof, or the average particle diameter of the powder materials, and thus is not particularly limited. The powders-falling-preventing layer having a mass per unit area of 1 g/m$^2$ or more does not have any problem in a practical use.

The powders-affixed nonwoven fabric of the present invention contains the fine short fibers and the powder materials, and thus exhibits various excellent characteristics. Therefore, the powders-affixed nonwoven fabric of the present invention, or the sheet material containing at least one powders-affixed nonwoven fabric layer of the present invention, may be used in many applications, for example, as a sheet for decomposing ozone in an electrophotography apparatus, deodorization in a lavatory, a generator of ozone, or the like; an ion exchanging sheet for an apparatus for purifying ion exchange water or the like; a catalyst sheet for a car, a chemical reaction apparatus, or the like; an deodorizing sheet for daily goods, sanitary goods, a filter, shoes, or the like; fiber reinforced plastics (FRP) or a sheet molding compound (SMC); or a refractory board or the like.

The powders-affixed nonwoven fabric of the present invention may be produced by, for example, the following method.

In the first place, the powder materials, and the aggregates (particularly, bundled aggregates) of fine short fibers having a fiber diameter of 4 μm or less and a fiber length of 3 mm or less, or a group of the aggregates (particularly, the bundled group of the bundled aggregates), and/or mechanically dividable fibers capable of generating fine short fibers having a fiber diameter of 4 μm or less and a fiber length of 3 mm or less, or aggregates (particularly, bundled aggregates) of the mechanically dividable fibers are prepared. When the adhesion rate of the substances adhered to the fine-short-fibers aggregates used or the group thereof, and/or the mechanically dividable fibers used or the aggregates thereof is 0.5 mass % or less (preferably 0.3 mass % or less, more preferably 0.1 mass % or less, still more preferably 0.08 mass % or less, still more preferably 0.06 mass % or less, still more preferably 0.04 mass % or less, most preferably 0.02 mass % or less), the powders-affixed nonwoven fabric of the present invention may be easily produced.

The fine-short-fibers aggregates with a low adhesion rate or the group thereof with a low adhesion rate, or the mechanically dividable fibers with a low adhesion rate or the aggregates thereof with a low adhesion rate may be prepared, for example, by washing commercially available fine-fibers aggregates or the group thereof, or the mechanically dividable fibers or the aggregates thereof with a solvent such as acetone to a level of 0.5 mass % or less with respect to the adhesion rate. Alternatively, the fine-short-fibers aggregates with a low adhesion rate or the group thereof with a low adhesion rate may be prepared, for example, by extracting and removing sea component from islands-in-sea type fibers or the group thereof obtained by a composite spinning method or a melt blend spinning method. Further, the adhesion rate of the resulting aggregates or the group thereof may be lowered by washing with a solvent such as acetone after extracting and removing the sea component from the islands-in-sea type fibers. When the adhered substances are removed, static electrical charges are prone to be generated on the surfaces of the fine short fibers, and the fine short fibers are easily dispersed due to an electrical repulsion between the fine short fibers.

When the fine short fibers in the fine-short-fibers-aggregates or the group thereof used are in an entangled state, a uniform dispersion of the fine short fibers would become difficult even by an action of a compressed gas as mentioned below, or the fine short fibers must be treated with the compressed gas many times. Therefore, it is preferable to use the aggregates wherein the fine short fibers are not entangled, or the group of such aggregates. For example, it is preferable not to use fine short fibers aggregates prepared by beating mechanically dividable fibers by a beater, pulps beaten by a beater, or fine short fibers aggregates prepared by a flash spinning method, because the fine short fibers are entangled to each other. Further, it is possible to use the mechanically dividable fibers capable of generating fine short fibers having a fiber diameter of 4 μm or less and a fiber length of 3 mm or less by an action of the compressed gas, or aggregates of the mechanically dividable fibers, such as whole aromatic polyamide short fibers or the aggregates thereof, or cellulose short fibers prepared by a solvent extraction method, or the aggregates thereof. Furthermore, it is preferable that the thick fibers or the aggregates thereof used are washed with acetone or the like to prepare the thick fibers or the aggregates thereof with a lower adhesion rate.

Thereafter, the fine-short-fibers aggregates or the group thereof, and/or the mechanically dividable fibers or the aggregates thereof, and optionally the thick fibers or the aggregates thereof, are supplied together with the powder materials to a nozzle while an action of the compressed gas is applied to the fine-short-fibers aggregates or the group thereof, and/or the mechanically dividable fibers or the aggregates thereof, and optionally the thick fibers or the aggregates thereof, so that they are ejected from the nozzle to a gas to thereby divide and disperse the fine short fibers from the fine-short-fibers aggregates or the group thereof, and/or divide the mechanically dividable fibers or the aggregates thereof into the fine short fibers, and dispersing the resulting fine short fibers. When the thick fibers or the aggregates thereof are used, they are supplied to a nozzle to thereby disperse the thick fibers, or divide and disperse the thick fibers from the aggregates. At the same time, the powder materials are also dispersed.

Preferably, the gas stream supplied to the nozzle is substantially a laminar flow. When the gas stream supplied to the nozzle is substantially a laminar flow, the fine short fibers are rarely entangled, and thus are easily dispersed. In general, the fine short fibers passed through the nozzle are prone to be entangled, if the fiber diameter of the fine short fibers passed through the nozzle is as thin as 4 μm or less, particularly 2 μm or less, and thus have a low rigidity, i.e., high pliability, the fine short fibers are in the form of the bundled aggregates or the group of the bundled aggregates, particularly, the bundled aggregates derived from the island components of the islands-in-sea type fibers, particularly the group of such bundled aggregates, or the fine short fibers are composed of the organic materials, and thus have a low rigidity, i.e., a high pliability. Nevertheless, the entanglement of such fine short fibers may be inhibited, using the gas stream in the form of a substantially laminar flow. The substantially laminar flow may be generated by using a Venturi tube as the nozzle.

The nozzle may have a constant cross-sectional area in a direction of flow from the supplier to the ejecting opening. Alternatively, the cross-sectional area may be continuously or discontinuously increased or decreased in the direction of flow; or continuously or discontinuously increased and then decreased, or continuously or discontinuously decreased and then increased in the direction of flow. Further, the ejected fine-fibers aggregates or the group thereof, and/or the ejected mechanically dividable fibers or the aggregates thereof may be brought into collision with a colliding means, such as a baffle plate, placed in front of the nozzle, to enhance the generating rate of the fine short fibers from the fine-fibers aggregates or the group thereof, and/or the mechanically dividable fibers or the aggregates thereof, and the dispersibility of the resulting fine short fibers. When the gas stream supplied to the nozzle is a substantially laminar flow, it is preferable to use the colliding means, such as the baffle plate, for promoting the dispersion, because the laminar flow has a poor action in the division and dispersal of the fine short fibers.

Any gas may be used as the compressed gas, and a compressed air may be preferably used for the production of the powders-affixed nonwoven fabric. A passing rate of the compressed gas at the ejecting opening of the nozzle is preferably 100 m/sec or more, so that the compressed gas can disperse the powder materials, and sufficiently generate the fine short fibers from the aggregates of the fine short fibers, or the groups of the aggregates, and disperse the resulting fine short fibers, and/or sufficiently divide the mechanically dividable fibers or the aggregates thereof into the fine short fibers, and disperse the resulting fine short fibers. The gas-passing rate is a value calculated by dividing a flowing amount ($m^3$/sec) under 1 atmosphere of the gas ejected from the nozzle by a cross-sectional area ($m^2$) of the ejecting opening of the nozzle. A pressure of the compressed gas is preferably 2 kg/$cm^2$ or more, so that the compressed gas can disperse the powder materials, and sufficiently generate the fine short fibers from the aggregates of the fine short fibers or the group of the aggregates, and disperse the resulting fine short fibers, and/or sufficiently divide the mechanically dividable fibers or the aggregates thereof into the fine short fibers, and disperse the resulting fine short fibers.

The gas as a dispersing medium in which the powder materials are dispersed, and the fine-short-fibers aggregates or the group thereof ejected from the nozzle are dispersed, and/or the mechanically dividable fibers or the aggregates thereof ejected from the nozzle are divided and dispersed is not particularly limited, but preferably is an air in view of the production of the powders-affixed nonwoven fabric.

When the adhesion rate of the substrates adhered to the fine-short-fibers aggregates or the group thereof, and/or the mechanically dividable fibers or the aggregates thereof is low, static electrical charges are prone to be generated by a friction between the nozzle and the fine-fibers aggregates or the group thereof, and/or the mechanically dividable fibers or the aggregates thereof. Therefore, the fine short fibers repel each other, and may be collected under the condition that the fine short fibers are more effectively dispersed to each other.

Then, the dispersed powder materials, the dispersed fine short fibers, and optionally dispersed thick fibers, are collected to form a powders-containing fiber web. The powder materials and the fine short fibers may be collected on a support such as a perforated roll or a net. The powder materials and the fine short fibers may be collected by allowing falling due to gravity-drop or by forcing the drop by use of suction from a position under the support. In the latter case, a strong suction results in a powder-containing fiber web wherein the powder materials and fine short fibers are in a close adhesion, whereas a weak suction results in a bulky powder-containing fiber web.

In the present invention, the mass ratio of the fine short fibers with respect to a whole mass of the powders-affixed nonwoven fabric may be 1 to 40 mass %. Therefore, the powders-affixed nonwoven fabric may contain a large amount of the powder materials, and thus, the functions of the powder materials may be sufficiently expressed. The amounts of the fine short fibers and the powder materials may be controlled by adjusting the amounts of the powder materials, and the fine-short-fibers aggregates or the group thereof, and/or the mechanically dividable fibers or the aggregates thereof supplied to the nozzle.

Subsequently, the powder materials in the powder-containing fiber web are bonded to form the powders-affixed nonwoven fabric. The bonding method is not particularly limited, but for example, a method wherein fibers (i.e., the fine short fibers and/or the thick fibers) or the powder materials are fused.

In addition to the basic process for manufacturing the powders-affixed nonwoven fabric of the present invention as above, it is preferable that, prior to the ejection of the powder materials, and fine-short-fibers aggregates or the group thereof, and/or the aggregates of the mechanically dividable fibers from the nozzle by the action of the compressed gas, the fine-short-fibers aggregates or the group thereof are separated into smaller aggregates or the group thereof, and/or the aggregates of the mechanically dividable fibers are separated into smaller aggregates, or dispersed, mixed in a mixer or the like, to facilitate the uniform dispersion.

Further, after the formation of the powders-containing fiber web and before the bonding of the powder materials, the powders-containing fiber web may be supplied to again to the same or different nozzle, and the powder materials and the fine short fibers re-ejected from the nozzle, re-dispersed in the gases, and re-collected to form a powders-containing fiber web. Such a procedure may be repeated.

It is possible to use jointly the fine-fibers aggregates or the group thereof, the mechanically dividable fibers or the aggregates thereof, and/or the aggregates of the thick fibers so that the resulting powders-affixed nonwoven fabric contains two or more kinds of fine short fibers and/or thick fibers having different fiber diameters. Further, the fine-short-fibers aggregates or the group thereof containing two or more kinds of fibers different from each other with respect to a fiber diameter, the mechanically dividable fibers or the aggregates thereof capable of generating two or more kinds of fibers different from each other with respect to a fiber diameter, and/or the thick fibers or the aggregates thereof containing two or more kinds of fibers different from each other with respect to a fiber diameter may be supplied to the nozzle while continuously or discontinuously varying a combination thereof, so that the powders-affixed nonwoven fabric containing layers or regions having various apparent densities in a thickness direction of the powders-affixed nonwoven fabric may be prepared. Further, two or more kinds of the powder materials different from each other with respect to the average particle diameter and/or the composition may be supplied to the nozzle while continuously or discontinuously varying the combined amount thereof.

The powders-affixed nonwoven fabric containing the powders-falling-preventing layer as above, or the sheet material containing the powders-affixed nonwoven fabric layer and the powders-falling-preventing layer as above, may be prepared by ejecting aggregates (particularly, bundled aggregates) of fine short fibers, or a group of the aggregates (particularly, bundled groups of plural bundled aggregates), and/or mechanically dividable fibers capable of generating fine short fibers, or aggregates (particularly, bundled aggregates) of the mechanically dividable fibers, without powder materials, from a nozzle into a gas by an action of a compressed gas, as in the above-mentioned method; collecting the dispersed fine short fibers to form a fiber web composed of the fine short fibers; forming a nonwoven fabric as the powders-falling-preventing layer by fusibility of the fine short fibers or entanglement with a fluid stream, such as a water jet, or a combination thereof; collecting the fine short fibers and the powder materials on the resulting nonwoven fabric as the powders-falling-preventing layer as in the above process; and then bonding the powder materials. When the nonwoven fabric layers composed of the fine short fibers are desired on both sides of the powders-affixed nonwoven fabric layer, another nonwoven fabric (as the powders-falling-preventing layer) composed of the fine short fibers is formed on the powders-affixed nonwoven fabric layer after the above process for preparing the powders-affixed nonwoven fabric containing the powders-falling-preventing layer, or the sheet material containing the powders-affixed nonwoven fabric layer and the powders-falling-preventing layer.

Alternatively, the powders-affixed nonwoven fabric containing the powders-falling-preventing layer, or the sheet material containing the powders-affixed nonwoven fabric layer and the powders-falling-preventing layer may be prepared by (1) forming a nonwoven fabric (i) by preparing a fiber web from fine short fibers by a conventional wet-laid method, and then bonding by a fusibility of the fine short fibers, entanglement by a fluid stream, such as a water jet, or a treatment of a combination thereof, or (ii) by a melt-blown method, or (iii) by forming a fiber web composed of mechanically dividable fibers by a dry-laid or wet-laid method, and then, entangling the fiber web by a fluid stream, such as a water jet, (2) collecting the fine short fibers and the powder materials on the resulting nonwoven fabric as the powders-falling-preventing layer as in the above process; and (3) affixing the powder materials. When the nonwoven fabric layers (the powders-falling-preventing layers) are desired on both sides of the powders-affixed nonwoven fabric layer, another nonwoven fabric same as the above nonwoven fabric which serves as the powders-falling-preventing layer is laminated and integrated. When the powders-falling-preventing layers are provided on both sides of the powders-affixed nonwoven fabric layer, the two powders-falling-preventing layers may be same as or different from each other with respect to the structures and the materials.

When collecting the dispersed fine short fibers and dispersed powder materials to form the powders-containing fiber web, the fine short fibers and the powder materials may be collected on a reinforcing material such as threads, a net, a woven fabric, a knitted fabric, a fiber web, or a usual nonwoven fabric, to form a laminate. The powders-affixed nonwoven fabric of the present invention may be enhanced with respect to the strength by forming the above laminate, and thus, may be used in applications to which strength is required. Alternatively, the laminate can be produced by forming the powders-affixed nonwoven fabric of the present invention and then laminating the resulting powders-affixed nonwoven fabric and a reinforcing material such as threads, a net, a woven fabric, a knitted fabric, a fiber web, a usual nonwoven fabric, or a film, to obtain the above advantages.

Figure 1:
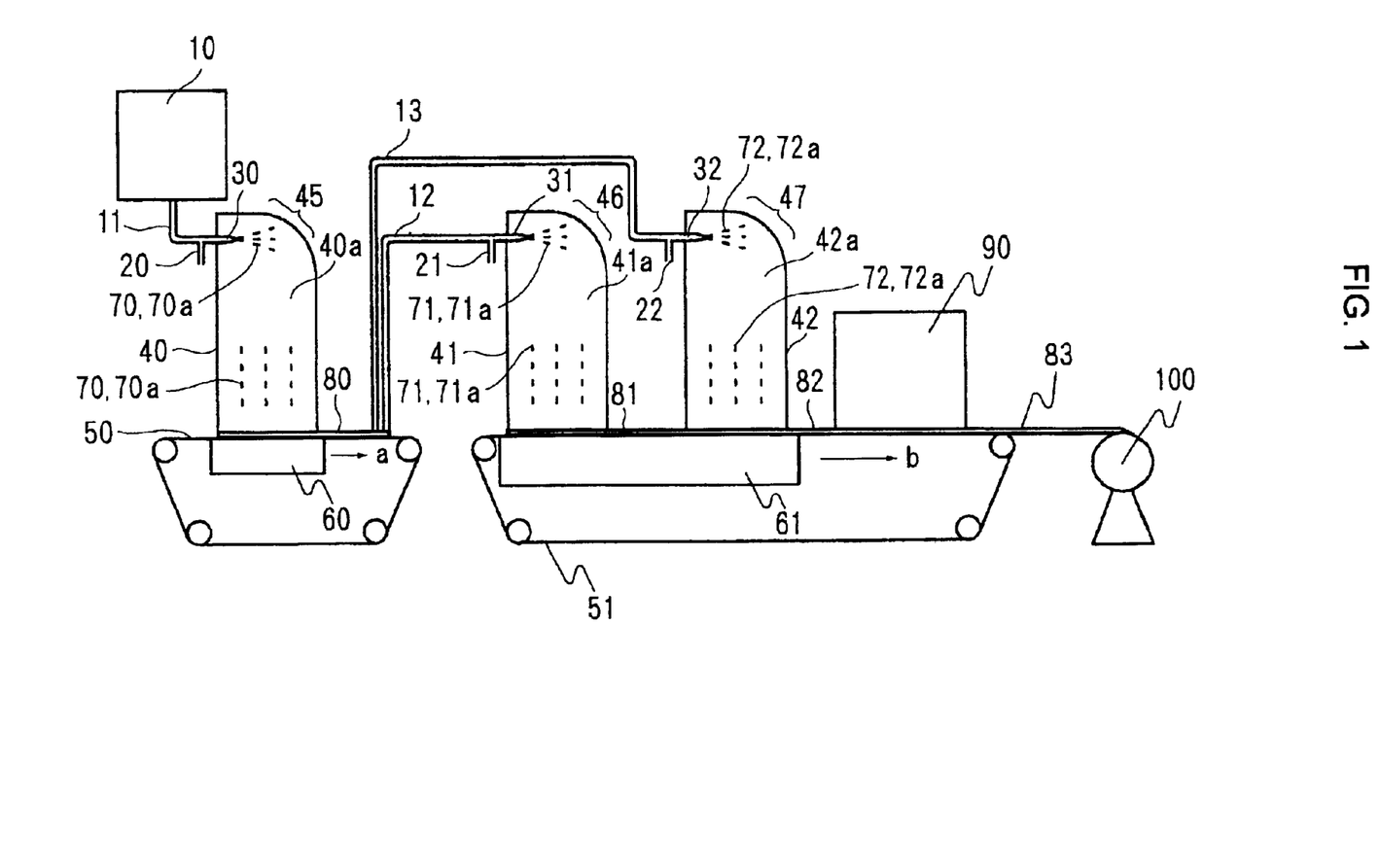
FIG. 1 schematically illustrates an embodiment of the apparatus for manufacturing the powders-affixed nonwoven fabric of the present invention.

The apparatus for manufacturing the powders-affixed nonwoven fabric of the present invention will be described hereinafter referring to FIG. 1 schematically illustrating an embodiment thereof. In this connection, the apparatus will be explained when the aggregates (particularly, the bundled aggregates) of fine short fibers having a fiber diameter of 4 μm or less and a fiber length of 3 mm or less are used.

The powder materials and the fine short fibers having a fiber diameter of 4 μm or less and a fiber length of 3 mm or less are incorporated into a mixing apparatus (such as a mixer) 10 in the form of the bundled aggregates of the fine short fibers aggregates, optionally together with the thick fibers or the aggregates thereof. In the mixing apparatus 10, the bundled aggregates are divided into smaller bundled aggregates, or the fine short fibers are dispersed, loosened, or mixed.

The loosened fine short fibers and/or bundled aggregates (and optionally the thick fibers and/or the aggregates thereof) or those mixed with the powder materials are supplied from the mixing apparatus 10 via a supplying tube 11 to a nozzle 30. An appropriate conveying gas from a conveying-gas supplying apparatus (not shown) placed on the mixing apparatus 10 may be used. A compressed gas is introduced from a compressed-gas inlet 20 into the supplying tube 11 at an inside position from and near to the nozzle 30. By an action of the compressed gas, bundled aggregates (and optionally the thick fibers and/or the aggregates thereof) are conveyed together with the powder materials 70a from the mixing apparatus 10 via the supplying tube 11 to the nozzle 30, and vigorously ejected from the nozzle 30 into a gas 40a in a dispersing chamber 40. Upon the ejection into the gas 40a, the fine short fibers 70 are generated from the bundled aggregates and dispersed together with the powder materials 70a in the dispersing chamber 40, by an interaction of a difference of an atmospheric pressure in the nozzle 30 and that in the gas 40a, and a turbulent flow formed between the ejected compressed gas and the gas 40a. Further, the division and the dispersion of the fine short fibers 70 ejected from the nozzle 30 and the dispersion of the powder materials 70a ejected therefrom are facilitated by bringing the powder materials 70a and the fine short fibers 70 into collision with a wall 45 of the dispersing chamber 40. The wall 45 serves as a colliding means. Further, a colliding means, such as a baffle plate, can be located between the ejecting opening of the nozzle 30 and the wall 45. A distance between the ejecting opening of the nozzle 30 and a flat region in the colliding means to be used for the collision is preferably 1 to 100 mm, more preferably 5 to 40 mm, still more preferably 5 to 30 mm, still more preferably 10 to 30 mm, most preferably 10 to 20 mm.

The fine short fibers 70 and the powder materials 70a dispersed in the gas 40a in the dispersing chamber 40 fall down in the dispersing chamber 40 and are collected on a support 50 of a net mounted on a bottom of the dispersing chamber 40 to form a powders-containing fiber web 80. In the manufacturing apparatus in the present invention as shown in FIG. 1, a gas suction apparatus 60 can be placed under the support 50 mounted on the bottom of the dispersing chamber 40 to suck the gas 40a in the dispersing chamber 40 and facilitate the collection of the fine short fibers 70 and the powder materials 70a. The inside of the dispersing chamber 40 may be or may not be hermetically sealed from the outside.

The support 50 for collecting the powders-containing fiber web 80 thereon is a rotating endless belt which conveys the powders-containing fiber web 80 to supplying tubes 12, 13 in a direction of an arrow a in FIG. 1. Then, the powders-containing fiber web 80 is similarly supplied via supplying tubes 12, 13 to nozzles 31, 32. The powders-containing fiber web may be re-supplied to two nozzles as shown in FIG. 1, or to one nozzle or three or more nozzles. Alternatively, when a sufficient dispersion is achieved, the powders-containing fiber web may be directly conveyed to a thermal fusing apparatus 90 as mentioned below.

A compressed gas is also introduced from compressed-gas inlets 21, 22 into each of the supplying tubes 12, 13 at an inside position from and near to each of the nozzles 31, 32. By an action of the compressed gases, the fine short fibers (and optionally the thick fibers) and the powder materials supplied from the powders-containing fiber web 80 are conveyed via the supplying tubes 12, 13 to the nozzles 31, 32, and vigorously ejected from the nozzles 31, 32 into gases 41a, 42a in dispersing chambers 41, 42, respectively. Upon the ejections, the fine short fibers 71, 72 and the powder materials 71a, 72a are uniformly dispersed, respectively. Further, the dispersion of each of the fine short fibers 71, 72 and the powder materials 71a, 72a ejected from the nozzles 31, 32 is facilitated by bringing the fine short fibers 71, 72 and the powder materials 71a, 72a into collision with walls 46, 47 of the dispersing chambers 41, 42, respectively. The walls 46, 47 serve as a colliding means. Further, colliding means can be located between the ejecting openings of the nozzles 31, 32 and the walls 46, 47.

The fine short fibers 71, 72 and the powder materials 71a, 72a dispersed in the gases 41a, 42a in the dispersing chambers 41, 42 fall down in the dispersing chambers 41, 42, respectively and are collected on a support 51 of a net mounted on the bottoms of the dispersing chambers 41, 42. More particularly, the fine short fibers 71 and the powder materials 71a dispersed in the gas 41a in the dispersing chamber 41 fall down in the dispersing chamber 41 and are collected on the support 51 to form a unilayered powders-containing fiber web 81. Then, the unilayered powders-containing fiber web 81 is conveyed by a rotating endless belt support 51 to the dispersing chamber 42 in a direction of an arrow b in FIG. 1. The fine short fibers 72 and the powder materials 72a dispersed in the gas 42a in the dispersing chamber 42 fall down in the dispersing chamber 42 and are collected on the unilayered powders-containing fiber web 81 carried on the support 51 to form a laminated powders-containing fiber web 82. The resulting laminated powders-containing fiber web 82 does not have a clear bi-layered structure, because the fine short fibers and powder materials of the unilayered powders-containing fiber web 80 are re-dispersed.

In the manufacturing apparatus used in the present invention as shown in FIG. 1, a gas suction apparatus 61 can be placed under the support 51 which is mounted on the bottoms of the dispersing chambers 41, 42 to suck the gases 41a, 42a in the dispersing chambers 41, 42 and facilitate the collection of the fine short fibers 71, 72 and the powder materials 71a, 72a. The support 51 and the gas suction apparatus 61 can be placed for a plurality of dispersing chambers as shown in FIG. 1, but may be placed for each of a plurality of dispersing chambers, respectively.

Thereafter, the laminated powders-containing fiber web 82 is conveyed by the endless belt support 51 to the thermal fusing apparatus 90 where the fine short fibers and/or the powder materials, and optionally the thick fibers, are fused by an action of heat to form a powders-affixed nonwoven fabric 83. The resulting powders-affixed nonwoven fabric 83 is reeled up on a reeling machine 100.

The sheet material of the present invention comprises at least one layer of the above-mentioned powders-affixed nonwoven fabric. That is, the sheet material of the present invention may be a unilayered sheet composed only of the above-mentioned powders-affixed nonwoven fabric layer, or may contain one or more layers of the above-mentioned powders-affixed nonwoven fabric, and one or more layers preventing the powder materials from falling or one or more reinforcing layers. The reinforcing layer may be, for example, a thread layer, a net layer, a woven fabric layer, a knitted fabric layer, a fiber web layer, or a usual nonwoven fabric layer. The sheet material comprising the powders-affixed nonwoven fabric layer and the reinforcing layer may be produced, for example, by collecting the powders-containing fiber web on the reinforcing layer, and then bonding the powders-containing fiber web with the reinforcing layer while forming the powders-affixed nonwoven fabric layer, or by bonding the powders-affixed nonwoven fabric layer and the reinforcing layer by an appropriate bonding means.

The sheet material of the present invention contains the powders-affixed nonwoven fabric layer, and may be used in many applications, in utilizing various properties of the powder materials, for example, as a sheet for decomposing ozone in an electrophotography apparatus, deodorization in a lavatory, a generator of ozone, or the like; an ion exchanging sheet for an apparatus for purifying ion exchange water or the like; a catalyst sheet for a car, a chemical reaction apparatus, or the like; an deodorizing sheet for daily goods, sanitary goods, a filter, shoes, or the like; fiber reinforced plastics (FRP) or a sheet molding compound (SMC); or a refractory board or the like.

EXAMPLES

The present invention will now be further illustrated by, but is by no means limited to, the following Examples.

Example 1

Islands-in-sea type fibers (fineness=1.7 dtex) having 25 island components of polypropylene in a sea component of polylactic acid were prepared by a composite spinning method, and cut to a fiber length of 1 mm. The resulting islands-in-sea type fibers were dipped in a 10 mass % aqueous solution of sodium hydroxide, and the sea component of polylactic acid was extracted and removed by hydrolysis. Then, the product was air-dried to obtain bundled aggregates of polypropylene fine short fibers (a fiber diameter=2 $\mu$m; a fiber length 1 mm; adhesion rate of adhered substances=less than 0.02 mass %), hereinafter referred to as fine short fibers A. The resulting fine short fibers A were drawn but not fibrillated. Each of fine short fibers A had substantially the same diameter in an axial direction thereof.

Islands-in-sea type fibers (fineness=1.7 dtex) having 25 island components of high-density polyethylene and polypropylene in a sea component of polylactic acid were prepared by a composite spinning method, and cut to a fiber length of 1 mm. The resulting islands-in-sea type fibers were dipped in a 10 mass % aqueous solution of sodium hydroxide, and the sea component of polylactic acid was extracted and removed by hydrolysis. Then, the product was air-dried to obtain bundled aggregates of the islands-in-sea type fine short fibers B (a fiber diameter=2 $\mu$m; a fiber length=1 mm; adhesion rate of adhered substances=less than 0.02 mass %; sectional shape=circle, and islands-in-sea type) wherein polypropylene components were scatteringly present in high-density polyethylene. The resulting fine fibers B were drawn but not fibrillated. Each of fine fibers B had substantially the same diameter in an axial direction thereof.

As the powder materials, activated carbon powders having an average particle size of 6 $\mu$m were used.

Thereafter, the powders-affixed nonwoven fabric of the present invention was produced by an apparatus similar to the manufacturing apparatus of the present invention as shown in FIG. 1. More particularly, the bundled aggregates of the fine short fibers A, the bundled aggregates of the islands-in-sea type fine short fibers B, and the activated carbon powders were charged into the mixer 10 at a mass ratio of 10:5:85, and loosened and mixed. The mixture was supplied to a Venturi tube with a truncated cone shape having a cross-sectional circular shape at an ejecting opening (diameter=8.5 mm) and a cross-sectional circular shape at a supplying side (diameter=3 mm), and a laminar compressed air (pressure=6 kg/cm$^2$) was introduced from the compressed-gas inlet at an inside position near to the Venturi tube. The mixture was ejected from the Venturi tube to the air at dispersing chamber and the activated carbon powders, the fine short fibers A, and the islands-in-sea type fine short fibers B were brought into collision with a baffle plate placed in front of the Venturi tube, and dispersed. The distance between the baffle plate and the ejecting opening of the Venturi tube was 15 mm. The gas-passing rate at the ejecting opening of the Venturi tube was 118 m/s.

Subsequently, the dispersed activated carbon powders, the fine short fibers A, and the islands-in-sea type fine short fibers B were collected on a nonwoven fabric substrate (a spun-bonded nonwoven fabric of polyester fibers; a mass per unit area=30 g/m$^2$) placed on the support of a net, while the air was sucked at a suction rate of 2 m$^3$/min by a suction box located under the support.

Then, the spun-bonded nonwoven fabric substrate carrying the powders-containing fiber web thereon was conveyed to an oven at 130° C. and heated for 3 minutes, to obtain a laminated nonwoven fabric (mass per unit area=70 g/m$^2$; thickness=1.2 mm) containing the powders-affixed nonwoven fabric layer and the spun-bonded nonwoven fabric substrate. In the resulting powders-affixed nonwoven fabric layer of the laminated nonwoven fabric, the fine short fibers A and the islands-in-sea type fine short fibers B were entangled in such a manner that the activated carbon powders were surrounded thereby. Further, the polypropylene fine short fibers A and the islands-in-sea type fine short fibers B were fused by the high-density polyethylene, and the islands-in-sea type fine short fibers and activated carbon powders were fused by the high-density polyethylene.

The spun-bonded nonwoven fabric substrate was removed from the laminated nonwoven fabric, and the properties of the powders-affixed nonwoven fabric layer were determined. The powders-affixed nonwoven fabric layer had a mass per unit area of 40 g/m$^2$; thickness of 1.1 mm; and an apparent density of 0.036 g/cm$^3$. A mass ratio of the fine short fibers A, B were 15 mass %. The adhesion rate of adhered substances, i.e., a percentage of total masses of the adhered substances extracted by dipping the powders-affixed nonwoven fabric layer in hot water for 15 minutes and the adhered substances extracted by dipping the powders-affixed nonwoven fabric layer in hot methanol for 15 minutes to a mass of the powders-affixed nonwoven fabric layer, was less than 0.02 mass %.

A filter unit was prepared by a pleat-processing of the laminated nonwoven fabric containing the powders-affixed nonwoven fabric layer and the spun-bonded nonwoven fabric substrate. A pleat height was 20 mm and a pitch was 2 mm. An air containing 25 ppm toluene was passed through the filter unit at a wind velocity of 14 cm/sec. A removing rate of toluene at an exit of the filter unit was more than 99%, and the filter unit exhibited a high deodorizing performance. Further, no dropping of the activated carbon powders was observed when the laminated nonwoven fabric was vibrated.

Example 2

The bundled aggregates of the fine short fibers A and the bundled aggregates of the islands-in-sea type fine short fibers B were prepared as in Example 1. Further, electrolytic manganese dioxide powders having an average particle size of 3 μm were used as the powder materials.

Thereafter, as in Example 1, the powders-affixed nonwoven fabric of the present invention was produced by an apparatus similar to the manufacturing apparatus as shown in FIG. 1. More particularly, the bundled aggregates of the fine short fibers A, the bundled aggregates of the islands-in-sea type fine short fibers B, and the electrolytic manganese dioxide powders were charged into the mixer at a mass ratio of 6:9:85, and loosened and mixed. The mixture was supplied to the nozzle having an orifice with a continuously narrowing cross-sectional circular shape (diameter at an ejecting opening=3.2 mm), and at the same time, a laminar compressed air (pressure=6 kg/cm$^2$) was introduced from the compressed-gas inlet at an inside position near to the nozzle. The mixture was ejected from the nozzle to the air at the dispersing chamber and the polypropylene fine short fibers A, islands-in-sea type fine short fibers B, and the electrolytic manganese dioxide powders were dispersed in the dispersing chamber. The gas-passing rate at the ejecting opening of the nozzle was 1600 m/s.

Subsequently, the dispersed electrolytic manganese dioxide powders, the fine short fibers A, and the islands-in-sea type fine short fibers B were collected on a nonwoven fabric substrate (a spun-bonded nonwoven fabric of polyester fibers; a mass per unit area 30 g/m$^2$) placed on the support of a net, while the air was sucked at a suction rate of 2 m$^3$/min by a suction box located under the support.

Then, the spun-bonded nonwoven fabric substrate carrying the powders-containing fiber web thereon was conveyed to an oven at 130° C. and heated for 3 minutes, to obtain a laminated nonwoven fabric (mass per unit area 90 g/m$^2$; thickness=1.0 mm) containing the powders-affixed nonwoven fabric layer and the spun-bonded nonwoven fabric substrate. In the resulting powders-affixed nonwoven fabric layer of the laminated nonwoven fabric, the polypropylene fine short fibers A and the islands-in-sea type fine short fibers B were entangled in such a manner that the electrolytic manganese dioxide powders were surrounded thereby. Further, the polypropylene fine short fibers A and the islands-in-sea type fine short fibers B were fused by the high-density polyethylene, and the islands-in-sea type fine short fibers B and electrolytic manganese dioxide powders were fused by the high-density polyethylene.

The spun-bonded nonwoven fabric substrate was removed from the laminated nonwoven fabric, and the properties of the powders-affixed nonwoven fabric layer were determined. The powders-affixed nonwoven fabric layer had a mass per unit area of 60 g/m$^2$; thickness of 0.9 mm; and an apparent density of 0.067 g/cm$^3$. A mass ratio of the fine short fibers A, B were 15 mass %. The adhesion rate of adhered substances, i.e., a percentage of total masses of the adhered substances extracted by dipping the powders-affixed nonwoven fabric layer in hot water for 15 minutes and the adhered substances extracted by dipping the powders-affixed nonwoven fabric layer in hot methanol for 15 minutes to a mass of the powders-affixed nonwoven fabric layer, was less than 0.02 mass %.

The laminated nonwoven fabric containing the powders-affixed nonwoven fabric layer and the spun-bonded nonwoven fabric substrate was pressed with an area calender (130° C.) to a thickness of 0.3 mm, and corrugated. A wave height was 2 mm and a pitch was 1.5 mm. An ozone gas at 10 ppm was passed through the corrugated product. A concentration of ozone at an exit of the corrugated product was less than 0.1 ppm, and the corrugated product exhibited an excellent property to decompose ozone. Further, no dropping of the electrolytic manganese dioxide powders was observed when the laminated nonwoven fabric was vibrated.

Example 3

Islands-in-sea type fibers (fineness=2.3 dtex) having 61 island components of crystalline polystyrene in a sea component of polyester copolymer were prepared by a composite spinning method, and cut to a fiber length of 0.5 mm. The resulting islands-in-sea type fibers were dipped in a 10 mass % aqueous solution of sodium hydroxide, and the sea component of polyester copolymer was extracted and removed by hydrolysis. Then, the product was air-dried to obtain bundled aggregates of crystalline polystyrene fine short fibers (a fiber diameter=1.1 μm; a fiber length=0.5 mm; adhesion rate of adhered substances=less than 0.02 mass %), hereinafter referred to as fine short fibers C. The resulting fine short fibers C were drawn but not fibrillated. Each of fine short fibers C had substantially the same diameter in an axial direction thereof.

The bundled aggregates of the islands-in-sea type fine short fibers B were prepared as in Example 1. Further, spherical alumina powders having an average particle size of 25 μm were used as the powder materials.

Thereafter, the powders-affixed nonwoven fabric of the present invention was produced by an apparatus similar to the manufacturing apparatus as shown in FIG. 1. More particularly, the bundled aggregates of the fine short fibers C, the bundled aggregates of the fine short fibers B, and the spherical alumina powders were charged into the mixer at a mass ratio of 1:1:98, and loosened and mixed. The mixture was supplied to the nozzle having an orifice with a continuously narrowing cross-sectional circular shape (diameter at an ejecting opening=3.2 mm), and at the same time, a laminar compressed air (pressure=6 kg/cm$^2$) was introduced from the compressed-gas inlet at an inside position near to the nozzle. The mixture was ejected from the nozzle to the air at the dispersing chamber and the crystalline polystyrene fine short fibers C, the islands-in-sea type fine short fibers B, and the spherical alumina powders were dispersed in the dispersing chamber. The gas-passing rate at the ejecting opening of the nozzle was 1600 m/s.

Subsequently, the dispersed spherical alumina powders, the crystalline polystyrene fine short fibers C, and the islands-in-sea type fine short fibers B were collected on a nonwoven fabric substrate (a spun-bonded nonwoven fabric of polyester fibers; a mass per unit area=30 g/m$^2$) placed on the support of a net, while the air was sucked at a suction rate of 2 m$^3$/min by a suction box located under the support.

Then, the spun-bonded nonwoven fabric substrate carrying the powders-containing fiber web thereon was conveyed to an oven at 130° C. and heated for 3 minutes, to obtain a laminated nonwoven fabric (mass per unit area=410 g/m²; thickness=0.55 mm) containing the powders-affixed nonwoven fabric layer and the spun-bonded nonwoven fabric substrate. In the resulting powders-affixed nonwoven fabric layer of the laminated nonwoven fabric, the crystalline polystyrene fine short fibers and the islands-in-sea type fine short fibers were entangled in such a manner that the spherical alumina powders were surrounded thereby. Further, the crystalline polystyrene fine short fibers C and the islands-in-sea type fine short fibers B were fused by the high-density polyethylene in the islands-in-sea type fine short fibers B, and the islands-in-sea type fine short fibers B and spherical alumina powders were fused by the high-density polyethylene.

The spun-bonded nonwoven fabric substrate was removed from the laminated nonwoven fabric, and the properties of the powders-affixed nonwoven fabric layer were determined. The powders-affixed nonwoven fabric layer had a mass per unit area of 380 g/m²; thickness of 0.45 mm; and an apparent density of 0.844 g/cm³. A mass ratio of the fine short fibers B, C were 2 mass %. The adhesion rate of adhered substances, i.e., a percentage of total masses of the adhered substances extracted by dipping the powders-affixed nonwoven fabric layer in hot water for 15 minutes and the adhered substances extracted by dipping the powders-affixed nonwoven fabric layer in hot methanol for 15 minutes to a mass of the powders-affixed nonwoven fabric layer, was less than 0.02 mass %.

Four powders-affixed nonwoven fabric layers were laminated, and pressed by a heat press at 130° C. under a pressure of 50 kg/cm², to obtain a pliable sheet (a mass per unit area=1520 g/m²; thickness=0.75 mm; apparent density= 2.03 g/cm³) having a high packing ratio of the alumina powders and a high thermal conductivity. The alumina powders did not drop from the pliable sheet. The pliable sheet had excellent handling properties and strength.

Example 4

Commercially available polyester fine short fibers (a fiber diameter=3.2 μm; a fiber length=3.0 mm; Teijin) were dipped in acetone, and a textile oil adhered to the surfaces of the fibers was extracted and removed. The bundled aggregates of the fine short fibers A, and the bundled aggregates of the fine short fibers B were prepared as in Example 1. Further, spherical alumina powders having an average particle size of 25 μm were used as the powder materials.

Thereafter, the powders-affixed nonwoven fabric of the present invention was produced by an apparatus similar to the manufacturing apparatus as shown in FIG. 1. More particularly, the polyester fine short fibers, the bundled aggregates of the fine short fibers A, the bundled aggregates of the islands-in-sea type fine short fibers B, and the spherical alumina powders were charged into the mixer at a mass ratio of 2:2:4:92, and loosened and mixed. The mixture was supplied to the nozzle having an orifice with a continuously narrowing cross-sectional circular shape (diameter at an ejecting opening=3.2 mm), and at the same time, a laminar compressed air (pressure=6 kg/cm²) was introduced from the compressed-gas inlet at an inside position near to the nozzle. The mixture was ejected from the nozzle to the air at the dispersing chamber and the polyester fine short fibers, fine short fibers A, islands-in-sea type fine short fibers B, and the spherical alumina powders were dispersed in the dispersing chamber. The gas-passing rate at the ejecting opening of the nozzle was 1600 m/s.

Subsequently, the dispersed spherical alumina powders, the polyester fine short fibers, the polypropylene fine short fibers A, and the islands-in-sea type fine short fibers B were collected on a nonwoven fabric substrate (a spun-bonded nonwoven fabric of polyester fibers; a mass per unit area=30 g/m²) placed on the support of a net, while the air was sucked at a suction rate of 2 m³/min by a suction box located under the support.

Then, the spun-bonded nonwoven fabric substrate carrying the powders-containing fiber web thereon was conveyed to an oven at 130° C. and heated for 3 minutes, to obtain a laminated nonwoven fabric (mass per unit area=450 g/m²; thickness=0.65 mm) containing the powders-affixed nonwoven fabric layer and the spun-bonded nonwoven fabric substrate. In the resulting powders-affixed nonwoven fabric layer of the laminated nonwoven fabric, the polyester fine short fibers, the polypropylene fine short fibers A, and the islands-in-sea type fine short fibers B were entangled in such a manner that the spherical alumina powders were surrounded thereby. Further, all of the fine short fibers, and the islands-in-sea type fine short fibers B and the spherical alumina powders were fused by the high-density polyethylene in the islands-in-sea type fine short fibers B.

The spun-bonded nonwoven fabric substrate was removed from the laminated nonwoven fabric, and the properties of the powders-affixed nonwoven fabric layer were determined. The powders-affixed nonwoven fabric layer had a mass per unit area of 420 g/m²; thickness of 0.55 mm; and an apparent density of 0.764 g/cm³. A mass ratio of the fine short fibers were 8 mass %. The adhesion rate of adhered substances, i.e., a percentage of total masses of the adhered substances extracted by dipping the powders-affixed nonwoven fabric layer in hot water for 15 minutes and the adhered substances extracted by dipping the powders-affixed nonwoven fabric layer in hot methanol for 15 minutes to a mass of the powders-affixed nonwoven fabric layer, was less than 0.02 mass %.

Two sheets of the powders-affixed nonwoven fabric layer were laminated, and pressed by a heat press at 130° C. under a pressure of 50 kg/cm², to obtain a pliable sheet (a mass per unit area=840 g/m²; thickness=0.43 mm; apparent density= 1.95 g/cm³) having a high packing ratio of the alumina powders and a high thermal conductivity. The alumina powders did not drop from the pliable sheet. The pliable sheet had excellent handling properties and strength.

Example 5

Islands-in-sea type fibers (fineness=8.8 dtex) having about 3900 island components of poly-4-methylpentene in a sea component of polyester copolymer were prepared by a composite spinning method, and cut to a fiber length of 0.5 mm. The resulting islands-in-sea type fibers were dipped in a 10 mass % aqueous solution of sodium hydroxide, and the sea component of polyester copolymer was extracted and removed by hydrolysis. Then, the product was air-dried to obtain bundled aggregates of poly-4-methylpentene fine short fibers (a fiber diameter=0.4 μm; a fiber length=0.5 mm; adhesion rate of adhered substances=less than 0.02 mass %); hereinafter referred to as fine short fibers D. The resulting fine short fibers D were drawn but not fibrillated. Each of fine short fibers D had varying diameter in an axial direction thereof.

Further, the bundled aggregates of the crystalline polystyrene fine short fibers C were prepared as in Example 3, and the bundled aggregates of the islands-in-sea type fine short fibers B were prepared as in Example 1.

Thereafter, using an apparatus similar to the manufacturing apparatus as shown in FIG. 1, the bundled aggregates of the poly-4-methylpentene fine short fibers D, the bundled aggregates of the crystalline polystyrene fine short fibers C, and the bundled aggregates of the islands-in-sea type fine short fibers B were charged into the mixer at a mass ratio of 40:20:40, and loosened and mixed. The mixture was supplied to the nozzle having an orifice with a continuously narrowing cross-sectional circular shape (diameter at an ejecting opening=3.2 mm), and at the same time, a laminar compressed air (pressure=6 kg/cm$^2$) was introduced from the compressed-gas inlet at an inside position near to the nozzle. The mixture was ejected from the nozzle to the air at the dispersing chamber and the poly-4-methylpentene fine short fibers D, the crystalline polystyrene fine short fibers C, and the islands-in-sea type fine short fibers B were dispersed in the dispersing chamber. The gas-passing rate at the ejecting opening of the nozzle was 1600 m/s.

Subsequently, the dispersed poly-4-methylpentene fine short fibers D, the crystalline polystyrene fine short fibers C, and the islands-in-sea type fine short fibers B were collected on a nonwoven fabric substrate (a spun-bonded nonwoven fabric of polyester fibers; a mass per unit area=30 g/m$^2$) placed on the support of a net, to obtain a composite nonwoven fabric of the above spun-bonded nonwoven fabric and a fine short fiber web (a mass per unit area=5 g/m$^2$) which is a layer for preventing powder materials from falling. When the fine short fibers were collected, the air was sucked at a suction rate of 2 m$^3$/min by a suction box located under the support.

Then, the bundled aggregates of poly-4-methylpentene fine short fibers D were prepared as above, the bundled aggregate of the crystalline polystyrene fine short fibers C were prepared as in Example 3, and the bundled aggregates of the islands-in-sea type fine short fibers B were prepared as in Example 1. Further, anatase-type titanium dioxide powders having an average particle size of 0.2 µm were used as the powder materials.

Thereafter, the bundled aggregates of the poly-4-methylpentene fine short fibers D, the bundled aggregates of the crystalline polystyrene fine short fibers C, the bundled aggregates of the islands-in-sea type fine short fibers B, and the anatase-type titanium dioxide powders were charged into the mixer at a mass ratio of 3:6:6:85, and loosened and mixed. The mixture was supplied to the nozzle having an orifice with a continuously narrowing cross-sectional circular shape (diameter at an ejecting opening=3.2 mm), and at the same time, a laminar compressed air (pressure=6 kg/cm$^2$) was introduced from the compressed-gas inlet at an inside position near to the nozzle. The mixture was ejected from the nozzle to the air at the dispersing chamber and the titanium dioxide powders, the poly-4-methylpentene fine short fibers D, the crystalline polystyrene fine short fibers C, and the islands-in-sea type fine short fibers B were dispersed in the dispersing chamber. The gas-passing rate at the ejecting opening of the nozzle 30 was 1600 m/s.

Subsequently, the dispersed titanium dioxide powders, the poly-4-methylpentene fine short fibers D, the crystalline polystyrene fine short fibers C, and the islands-in-sea type fine short fibers B were collected on the fine short fibers web (a mass per unit area=5 g/m$^2$; the layer for preventing the powder materials from falling) of the composite nonwoven fabric of the fine short fiber web/the spun-bonded nonwoven fabric substrate, to thereby obtain a composite nonwoven fabric of the powders-containing fiber web/the fine short fiber web/the spun-bonded nonwoven fabric substrate. When the collection was conducted, the air was sucked at a suction rate of 2 m$^3$/min by a suction box located under the support.

Thereafter, as in the above process, the bundled aggregates of the poly-4-methylpentene fine short fibers D, the bundled aggregates of the crystalline polystyrene fine short fibers C, and the bundled aggregates of the islands-in-sea type fine short fibers B were ejected and dispersed, and then collected on the powders-containing fiber web of the composite nonwoven fabric of the powders-containing fiber web/the fine short fiber web/the spun-bonded nonwoven fabric substrate, to thereby obtain a composite nonwoven fabric of a fine short fiber web/the powders-containing fiber web/the fine short fiber web/the spun-bonded nonwoven fiber web substrate.

Then, the composite nonwoven fabric of the fine short fibers web/the powders-containing fiber web/the fine short fiber web/the spun-bonded nonwoven fabric substrate was conveyed to an oven at 130° C. and heated for 3 minutes, to obtain a laminated nonwoven fabric (mass per unit area=270 g/m$^2$; thickness=0.42 mm) containing the powders-affixed nonwoven fabric layer, the spun-bonded nonwoven fabric substrate and two layers of the fine short fibers on both sides of the powders-affixed nonwoven fabric layer. In the resulting powders-affixed nonwoven fabric layer of the laminated nonwoven fabric, the poly-4-methylpentene fine short fibers D, the crystalline polystyrene fine short fibers C, and the islands-in-sea type fine short fibers B were entangled in such a manner that the titanium dioxide powders were surrounded thereby. Further, all the fine short fibers, and the islands-in-sea type fine short fibers B and the titanium dioxide powders were fused by the high-density polyethylene in the islands-in-sea type fine short fibers B. Furthermore, the falling of the titanium dioxide powders was prevented by two fiber layers (layers for preventing the powder materials from falling) stemmed from the fiber webs composed of the fine short fibers.

The spun-bonded nonwoven fabric substrate was removed from the composite nonwoven fabric, and the properties of the three-layered powders-affixed nonwoven fabric were determined. The three-layered powders-affixed nonwoven fabric had a mass per unit area of 240 g/m$^2$; thickness of 0.32 mm; and an apparent density of 0.750 g/cm$^3$. A mass ratio of the fine short fibers in the powders-affixed layer of the three-layered fabric were 15 mass %. The adhesion rate of adhered substances, i.e., a percentage of total masses of the adhered substances extracted by dipping the three-layered powders-affixed nonwoven fabric in hot water for 15 minutes and the adhered substances extracted by dipping the three-layered powders-affixed nonwoven fabric in hot methanol for 15 minutes to a mass of the three-layered powders-affixed nonwoven fabric, was less than 0.02 mass %.

A filter unit was prepared by a pleat-processing of the composite nonwoven fabric containing the powders-affixed nonwoven fabric layer. A pleat height was 20 mm and a pitch was 2 mm. An air containing 100 ppb toluene was passed through the filter unit at a rate of 20 cm/sec under UV radiation. A removing rate of toluene at an exit of the filter unit was 80%. Further, no dropping of the titanium dioxide powders was observed when the composite nonwoven fabric was vibrated.

Example 6

The bundled aggregates of the islands-in-sea type fine short fibers B were prepared as in Example 1.

Then, the bundled aggregates of the islands-in-sea type fine short fibers B were charged into the mixer, and loosened. The loosened fibers were supplied to the nozzle having an orifice with a continuously narrowing cross-sectional circular shape (diameter at an ejecting opening=3.2 mm), and at the same time, a laminar compressed air (pressure=6 kg/cm$^2$) was introduced from the compressed-gas inlet at an inside position near to the nozzle. The mixture was ejected from the nozzle to the air at the dispersing chamber and the islands-in-sea type fine fibers B were dispersed in the dispersing chamber. The gas-passing rate at the ejecting opening of the nozzle was 1600 m/s.

Subsequently, the dispersed islands-in-sea type fine short fibers B were collected on a nonwoven fabric substrate (a spun-bonded nonwoven fabric of polyester fibers; a mass per unit area=30 g/m$^2$) placed on the support of a net, to obtain a laminated nonwoven fabric of the fine short fibers web (mass per unit area=5 g/m$^2$) /the spun-bonded nonwoven fabric substrate. When the fibers were collected, the air was sucked at a suction rate of 2 m$^3$/min by a suction box located under the support.

Thereafter, the bundled aggregates of the islands-in-sea type fine short fibers B were prepared as in Example 1. Further, low-density polyethylene powders (an average particle size=12 µm; Sumitomo Seika) were used as the powder materials.

Thereafter, the bundled aggregates of the islands-in-sea type fine short fibers B, and the low-density polyethylene powders were charged into the mixer at a mass ratio of 5:95, and loosened and mixed. The mixture was supplied to the nozzle having an orifice with a continuously narrowing cross-sectional circular shape (diameter at an ejecting opening 3.2 mm), and at the same time, a laminar compressed air (pressure=6 kg/cm$^2$) was introduced from the compressed-gas inlet at an inside position near to the nozzle. The mixture was ejected from the nozzle to the air at the dispersing chamber and the low-density polyethylene powders and the islands-in-sea type fine fibers B were dispersed in the dispersing chamber. The gas-passing rate at the ejecting opening of the nozzle was 1600 m/s.

Subsequently, the dispersed low-density polyethylene powders, and the islands-in-sea type fine short fibers B were collected on the fine short fibers web (a mass per unit area=5 g/m$^2$) of the laminated nonwoven fabric of the fine short fibers web/the spun-bonded nonwoven fabric, to thereby obtain a composite nonwoven fabric of the powders-containing fiber web/the fine short fibers web/the spun-bonded nonwoven fabric substrate. When the collection was conducted, the air was sucked at a suction rate of 2 m$^3$/min by a suction box located under the support.

Then, the composite nonwoven fabric of the powders-containing fiber web/the fine short fibers web/the spun-bonded nonwoven fabric substrate was conveyed to an oven at 107° C. and heated for 5 minutes, to obtain a composite nonwoven fabric (mass per unit area=118 g/m$^2$; thickness=0.55 mm) containing the powders-affixed nonwoven fabric layer. In the resulting laminated nonwoven fabric, the islands-in-sea type fine short fibers B were entangled in such a manner that the low-density polyethylene powders were surrounded thereby. Further, a part of the high-density polyethylene in the islands-in-sea type fine short fibers B and a part of the low-density polyethylene powders were melted, and thus, the islands-in-sea type fine short fibers B were fused to each other, and the islands-in-sea type fine short fibers B and the low-density polyethylene powders were fused. The falling of the low-density polyethylene powders was prevented by the fiber layer (the layer for preventing the powder materials from falling) stemmed from the fiber web composed of the islands-in-sea type fine short fibers B.

The spun-bonded nonwoven fabric substrate was removed from the composite nonwoven fabric, and the properties of the two-layered powders-affixed nonwoven fabric were determined. The two-layered powders-affixed nonwoven fabric had a mass per unit area of 88 g/m$^2$; thickness of 0.45 mm; and an apparent density of 0.196 g/cm$^3$. A mass ratio of the fine short fibers in the powders-affixed nonwoven fabric layer of the two-layered fabric were 5 mass %. The low-density polyethylene powders did not drop from the two-layered powders-affixed nonwoven fabric. The adhesion rate of adhered substances, i.e., a percentage of total masses of the adhered substances extracted by dipping the two-layered powders-affixed nonwoven fabric in hot water for 15 minutes and the adhered substances extracted by dipping the two-layered powders-affixed nonwoven fabric in hot methanol for 15 minutes to a mass of the two-layered powders-affixed nonwoven fabric, was less than 0.02 mass %.

The two-layered powders-affixed nonwoven fabric was treated in an oven at 125° C. for 5 minutes, whereby the low-density polyethylene powders were melted and converted to a film form, to thereby obtain a fiber reinforced plastic (FRP) sheet (a mass per unit area=88 g/m$^2$; a thickness=0.14 mm; an apparent density=0.629 g/cm$^2$) wherein the islands-in-sea type fine sheet fibers were dispersed in the low-density polyethylene film. The resulting sheet had excellent pliability and strength. The result shows that the islands-in-sea type fine short fibers B served as a reinforcing agent in the FRP.

As above, the powder materials having small particle diameters rarely drop from the powders-affixed nonwoven fabric of the present invention, and the inherent functions the powder materials can be exhibited.

When an average particle size of the powder materials in the powders-affixed nonwoven fabric is 50 µm or less, functions of the powder materials can be expressed to a maximum degree.

When a mass ratio of the fine short fibers with respect to a whole mass of the powders-affixed nonwoven fabric is 1 to 40 mass %, functions of the powder materials can be expressed to a maximum degree, because an amount of the powder materials becomes large.

When an adhesion rate of substances adhered to the nonwoven fabric is 0.5 mass % or less, functions of the powder materials are not affected by the substances adhered to the powders-affixed nonwoven fabric.

When the powders-affixed nonwoven fabric contains the powders-falling-preventing layer on at least one surface of the powders-affixed nonwoven fabric layer, the falling of the powder materials can be more effectively prevented.

According to the present process for manufacturing a powders-affixed nonwoven fabric, the nonwoven fabric containing the powder materials affixed to the fiber web prepared by a method other than a wet-laid method, from the dispersed fine short fibers having a fiber diameter of 4 µm or less and a fiber length of 3 mm or less, can be easily prepared.

As above, the present invention was explained with reference to particular embodiments, but modifications and improvements obvious to those skilled in the art are included in the scope of the present invention.

What is claimed is:

1. A powders-affixed nonwoven fabric prepared, as a starting material for said powders-affixed nonwoven fabric, only from a powders-containing fiber web comprising powder materials and fine short fibers having a fiber diameter of 4 μm or less and a fiber length of 3 mm or less, wherein said powders materials and said fine short fibers are dispersed in said powders-containing fiber web, said powders-containing fiber web is formed by a method other than a wet-laid method, said fine short fibers consist of island components remaining after removing a sea component from islands-in-sea type fibers, or fibers derived from mechanically dividable fibers, and said fine short fibers are bonded by a fusion thereof.

2. The powders-affixed nonwoven fabric according to claim 1, wherein an average particle size of the powder materials is 50 μm or less.

3. The powders-affixed nonwoven fabric according to claim 1, wherein a mass ratio of the fine short fibers with respect to a whole mass of the powders-affixed nonwoven fabric is 1 to 40 mass %.

4. The powders-affixed nonwoven fabric according to claim 1, wherein an adhesion rate of substances adhered to said powder-affixed nonwoven fabric is 0.5 mass % or less.

5. The powders-affixed nonwoven fabric according to claim 1, wherein the fine short fibers are formed from one or more organic components.

6. A process for manufacturing a powders-affixed nonwoven fabric comprising the steps of:

ejecting aggregates of fine short fibers having a fiber diameter of 4 μm or less and a fiber length of 3 mm or less, or a group of the aggregates, and/or mechanically dividable fibers capable of generating fine short fibers having a fiber diameter of 4 μm or less and a fiber length of 3 mm or less, or aggregates of the mechanically dividable fibers, together with powder materials, from a nozzle into a gas by an action of a compressed gas, to thereby divide the aggregates of the fine short fibers or the group thereof into the fine short fibers, and/or divide the mechanically dividable fibers or the aggregates thereof into the fine short fibers, and disperse the resulting fine short fibers and the powder materials;

collecting the dispersed fine short fibers and the powder materials to form a powders-containing fiber web; and affixing the powder materials by a fusion of the fine short fibers, while forming a nonwoven fabric from the powders-containing fiber web to obtain the powders-affixed nonwoven fabric.

7. The process according to claim 6, wherein bundled aggregates of fine short fibers are supplied to the nozzle.

8. The process according to claim 6, wherein before supplying the fine-fibers aggregates or the group thereof, and/or the mechanically dividable fibers or the aggregates thereof to the nozzle, adhered substances are removed from the fine-fibers aggregates or the group thereof, and/or the mechanically dividable fibers or the aggregates thereof.

9. The process according to claim 6, wherein a gas stream supplied to the nozzle is substantially a laminar flow.

10. The process according to claim 6, wherein the fine-fibers aggregates or the group thereof, and/or the mechanically dividable fibers or the aggregates thereof, and the powder materials are ejected from the nozzle and brought into collision with a colliding means placed in front of the nozzle.

11. A sheet material comprising at least one layer of the powder-affixed nonwoven fabric according to claim 1.

12. The sheet material according to claim 11, further comprising a layer free of the powder materials on at least one surface.

13. A process for manufacturing a sheet material comprising the steps of:

ejecting aggregates of fine short fibers having a fiber diameter of 4 μm or less and fiber length of 3 mm or less, or a group of the aggregates, and/or mechanically dividable fiber capable of generating fine-short fibers having a fiber diameter of 4 μm or less and a fiber length of 3 mm or less, or aggregates of the mechanically dividable fibers, together with powder materials, from a nozzle into a gas by an action of a compressed gas, to thereby divide the aggregates of the fine short fibers or the group thereof into the fine short fibers, and/or divide the mechanically dividable fibers or the aggregates thereof into the fine short fibers, and disperse the resulting fine short fibers and the powder materials;

collecting the dispersed fine short fibers and the powder materials to form a powders-containing fiber web; and affixing the powder materials by a fusion of the fine short fibers, while forming a nonwoven fabric from the powders-containing fiber web, and at the same time bonding a layer free of the powder materials, to obtain the sheet material containing a powders-affixed nonwoven fabric.

* * * * *